(12) United States Patent
Murphy et al.

(10) Patent No.: US 9,890,701 B2
(45) Date of Patent: *Feb. 13, 2018

(54) TOROIDAL ENGINE

(71) Applicant: Monashee Pumps Inc., Halifax (CA)

(72) Inventors: Braden Murphy, Halifax (CA); Aziz Martakoush, Halifax (CA); Adam Krajewski, Toronto (CA); Brett Dickey, Waverley (CA); Jean-Francois Pelletier, Campbellton (CA); Darrel Doman, Halifax (CA)

(73) Assignee: MONASHEE PUMPS INC., Halifax (CA)

( * ) Notice: Subject to any disclaimer, the term of this patent is extended or adjusted under 35 U.S.C. 154(b) by 719 days.

This patent is subject to a terminal disclaimer.

(21) Appl. No.: 14/228,053

(22) Filed: Mar. 27, 2014

(65) Prior Publication Data

US 2014/0294646 A1    Oct. 2, 2014

Related U.S. Application Data

(62) Division of application No. 12/916,979, filed on Nov. 1, 2010, now Pat. No. 8,695,564.

(60) Provisional application No. 61/301,436, filed on Feb. 4, 2010.

(51) Int. Cl.
*F02B 53/00* (2006.01)
*F02B 53/08* (2006.01)
*F01C 9/00* (2006.01)

(52) U.S. Cl.
CPC ............... *F02B 53/08* (2013.01); *F01C 9/00* (2013.01); *Y02T 10/17* (2013.01)

(58) Field of Classification Search
CPC .. F02B 53/08; F01C 9/00; F01C 21/08; Y02T 10/17; E21B 3/00; B25D 6/00; B25B 17/00; B25B 21/00
USPC ........................... 123/241; 74/21, 22 A, 133
See application file for complete search history.

(56) References Cited

U.S. PATENT DOCUMENTS

| | | |
|---|---|---|
| 1,212,649 A | 1/1917 | Krikorian |
| 1,298,839 A | 4/1919 | Weed |
| 1,790,534 A | 1/1931 | Chevallier et al. |
| 1,973,397 A | 9/1934 | Stromberg |
| 3,186,383 A | 6/1965 | Potter |
| 3,251,347 A | 5/1966 | Farb |
| 3,381,669 A | 5/1968 | Tschudi |

(Continued)

FOREIGN PATENT DOCUMENTS

| | | |
|---|---|---|
| CA | 2533496 | 2/2005 |
| WO | 2003083276 | 10/2003 |

*Primary Examiner* — Ngoc T Nguyen
(74) *Attorney, Agent, or Firm* — Bereskin & Parr LLP/S.E.N.C.R.L., S.R.L.

(57) ABSTRACT

A toroidal engine that can be powered by a fuel/air mixture or by a compressed gas source. The toroidal engine uses one-way bearings to transfer torque generated in a toroidal chamber directly to a drive shaft. Pairs of pistons are mounted on two crank assemblies, which are concentric with the drive shaft. One-way bearings allow the crank assemblies to turn, one at a time, in one direction only. The crank assemblies are directly coupled to the drive shaft, which eliminates the need for complex gear and linkage arrangements. A system can be used with the toroidal engine to alternately stop the crank assemblies at a pre-determined position and to time the ignition of the engine.

9 Claims, 13 Drawing Sheets

(56) References Cited

U.S. PATENT DOCUMENTS

| | | | |
|---|---|---|---|
| 3,909,162 A | | 9/1975 | Nutku |
| 3,990,405 A | * | 11/1976 | Kecik ..................... F01C 1/063 |
| | | | 123/219 |
| 4,035,111 A | | 7/1977 | Cronen, Sr. |
| 4,319,551 A | | 3/1982 | Rubinshtein |
| 5,009,206 A | | 4/1991 | Yi |
| 5,046,465 A | | 9/1991 | Yi |
| 5,199,391 A | | 4/1993 | Kovalenko |
| 5,222,463 A | | 6/1993 | Farrell |
| 5,224,847 A | * | 7/1993 | Kurisu ..................... F01C 1/077 |
| | | | 418/36 |
| 5,242,288 A | | 9/1993 | Vincent |
| 5,303,546 A | | 4/1994 | Farrell |
| 5,323,737 A | | 6/1994 | Farrell |
| 5,324,176 A | | 6/1994 | Farrell |
| 5,467,744 A | | 11/1995 | Farrell |
| 5,622,149 A | | 4/1997 | Wittry |
| 6,158,987 A | * | 12/2000 | Raikamo ................ F01C 1/063 |
| | | | 418/34 |
| 6,257,196 B1 | * | 7/2001 | Alvarado ................ F01C 1/073 |
| | | | 123/245 |
| 6,321,693 B1 | * | 11/2001 | Kim ....................... F01C 9/002 |
| | | | 123/18 R |
| 6,341,590 B1 | | 1/2002 | Barrera et al. |
| 6,739,307 B2 | | 5/2004 | Morgado |
| 6,895,922 B1 | | 5/2005 | Stoughton |
| 7,059,294 B2 | | 6/2006 | Wright |
| 7,182,061 B2 | * | 2/2007 | Georgescu ............. F01C 1/073 |
| | | | 123/241 |
| 7,222,601 B1 | * | 5/2007 | Kamenov ............... F01C 9/002 |
| | | | 123/18 R |
| 2005/0207687 A1 | * | 9/2005 | Fujita ..................... F16C 33/62 |
| | | | 384/492 |

\* cited by examiner

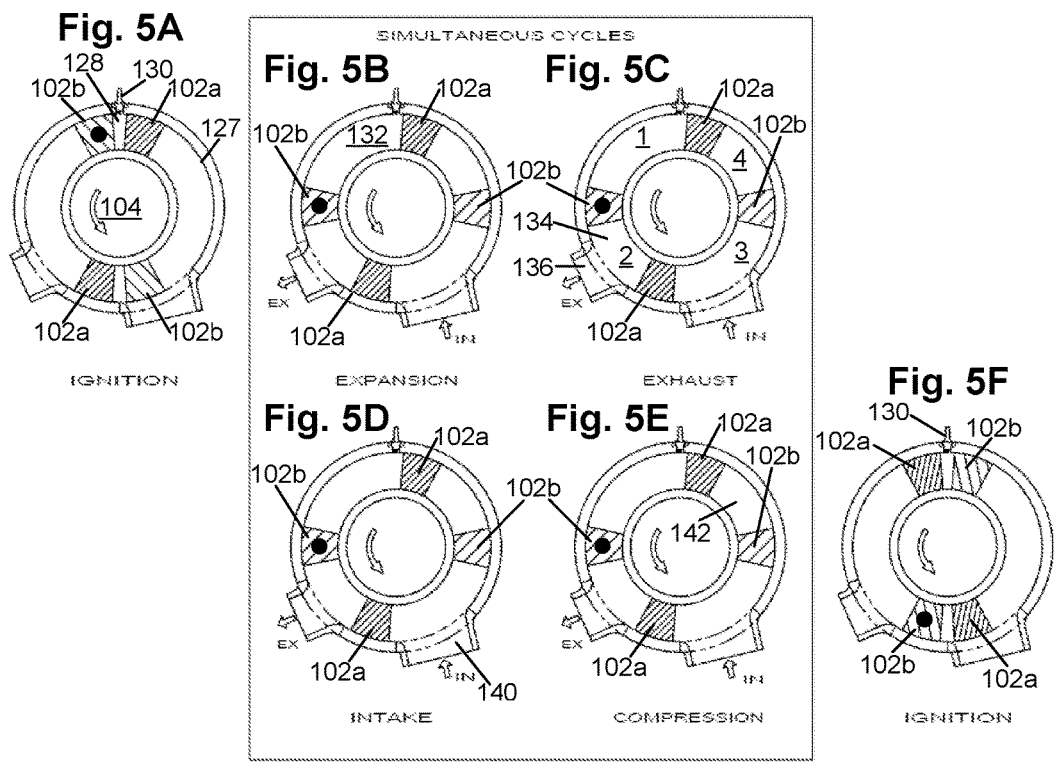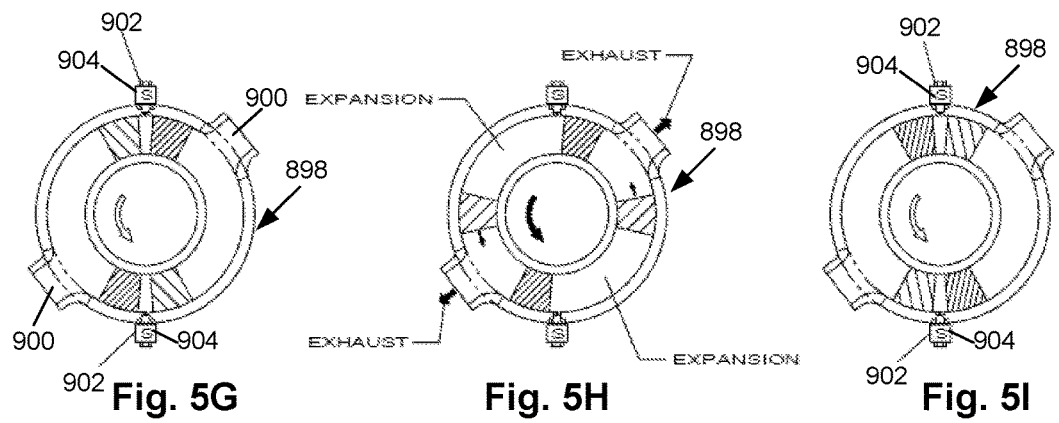

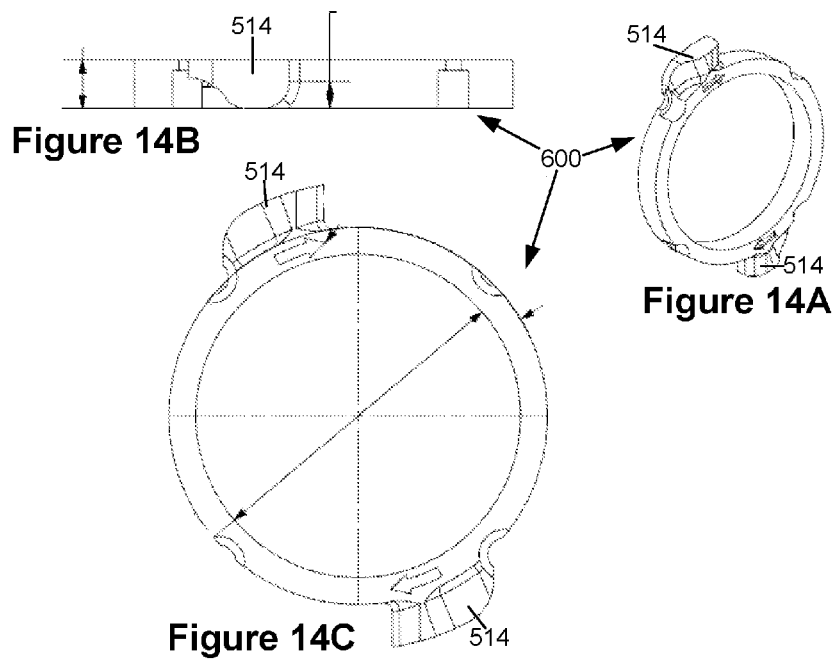

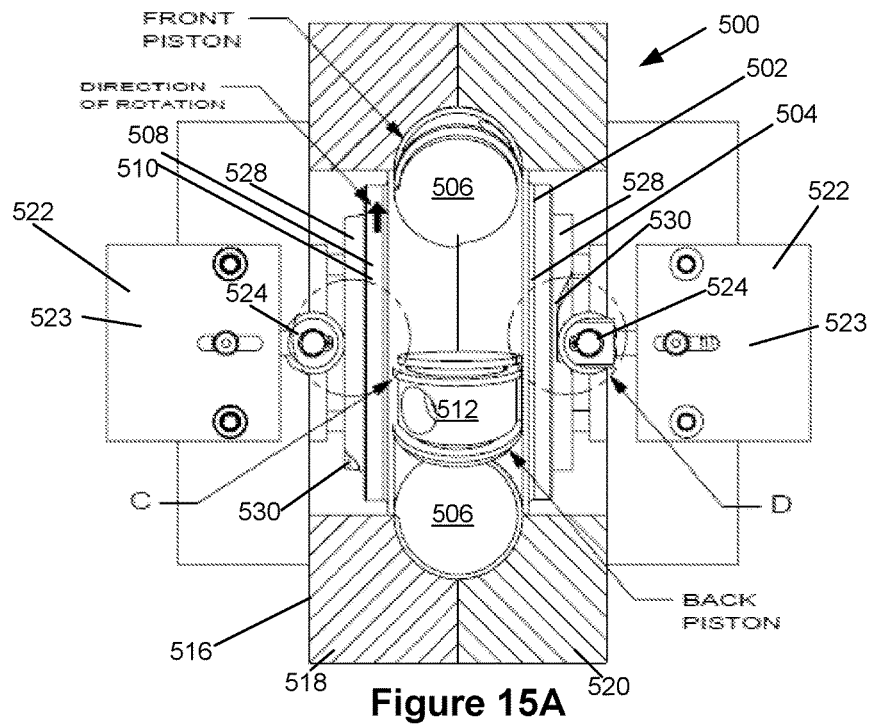
Figure 15A
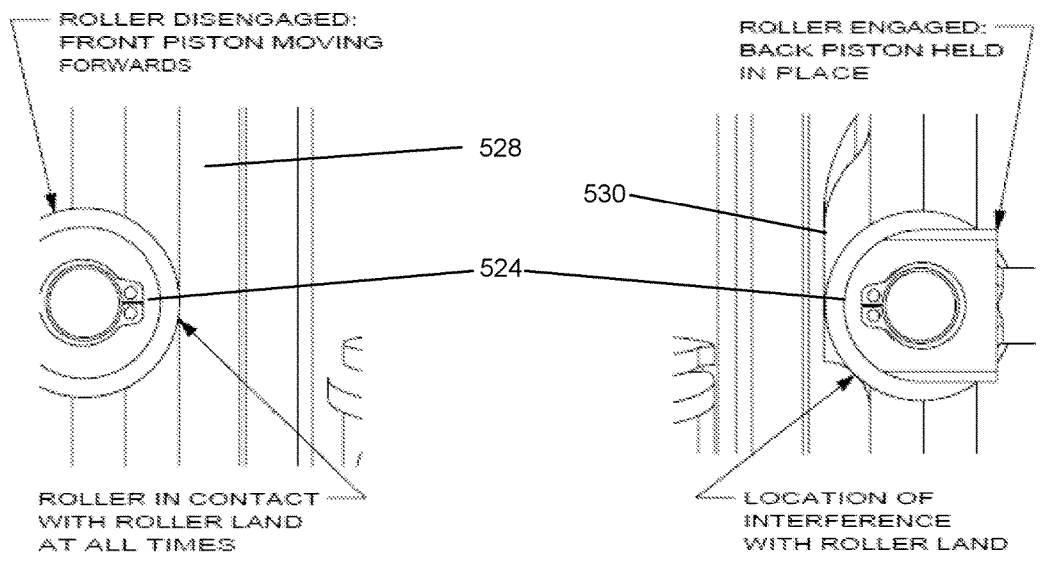
Figure 15B
Figure 15C

TOROIDAL ENGINE

This application is a divisional of U.S. patent application Ser. No. 12/916,979 filed Nov. 1, 2010 which claims priority to U.S. Provisional Patent Application No. 61/301,436 filed Feb. 4, 2010, all of which are incorporated herein by reference in their entirety.

FIELD OF THE INVENTION

The present invention relates generally to internal combustion engines. More particularly, the present invention relates to internal combustion engines having a toroidal cylinder. The present invention also relates to pneumatic engines having a toroidal cylinder.

BACKGROUND OF THE INVENTION

Conventional internal combustion engines comprising reciprocating pistons connected to a crank shaft are known. Such engines are inefficient in terms of transferring force applied to the pistons, by the exploding fuel, to the crank shaft. FIG. 1 shows a cross-section of a prior art internal combustion engine that converts a linear force of expansion (F) into rotational work on the crank shaft. The torque (T) on the crank shaft produced by a force F pushing on a piston connected to a crank shaft of radius r, which can also be referred to as the crank offset, can be written as:

$$T = rF(\theta) \approx rF \sin(\theta) \qquad \text{(Equation 1)}$$

Equation 1 shows us that the presence of the angle theta θ between the force 'F' and the radius 'r' reduces the output torque by a factor of sin(θ) and, as such, makes for low force transfer at small angles. As will be understood by the skilled worker, the component of force that transmits torque is only approximately a function of sin(θ) due to the kinematics of the crank-slider and due to losses in the crank, piston, and connecting rod.

Internal combustion engines having toroidal chambers with piston pairs formed therein are also known. The pistons can be coupled to a drive shaft through complex arrangements of gears and linkages, or through clutch mechanisms. Although these engines are smaller in size than comparable conventional combustion engines with equivalent displacement, their gear and linkages arrangement are still relatively bulky with respect to their toroidal chambers. Timing mechanisms to time the fuel ignition for such toroidal combustion engines can include electrical timing mechanism and/or mechanical timing mechanisms. Such timing mechanisms typically require that the movement of many parts be synchronized, which can negatively impact the manufacturing and maintenance costs of the engines.

Therefore, improvements in toroidal internal combustion engines are desirable.

SUMMARY OF THE INVENTION

It is an object of the present invention to obviate or mitigate at least one disadvantage of previous reciprocating and toroidal engines.

In a first aspect, the present invention provides a toroidal internal combustion engine that comprises: a first crank assembly having first pistons secured thereto, the first crank assembly further having formed thereon a first interference structure; a second crank assembly having second pistons secured thereto, the second crank assembly having formed thereon a second interference structure; a housing to house the first crank assembly and the second crank assembly, the toroidal chamber being defined by the housing, the first crank assembly and the second crank assembly, each of the first pistons being interposed between a pair of second pistons to define variable volume compartments in the toroidal chamber, one of the variable volume compartments being a combustion compartment; a drive shaft, the first crank assembly and the second crank assembly being operationally coupled to the drive shaft to alternately turn the drive shaft in a pre-determined direction, the housing being operationally coupled to the first crank assembly and to the second crank assembly to prevent the first crank assembly and the second crank assembly from rotating in a direction opposite the pre-determined direction; and a system to alternately stop a rotation of the first crank assembly upon one of the first pistons being in a pre-determined position and a rotation of the second crank assembly upon one of the second pistons being in the predetermined position, the system having a first member and a second member to interfere respectively with the first interference structure and the second interference structure, the first member to temporarily stop the first crank assembly in the pre-determined position upon the first member interfering with the first interference structure, the second member to temporarily stop the second crank assembly in the pre-determined position upon the second member interfering with the second interference structure, the system further having an electrical circuit operationally connected to the first member and to the second member, the electrical circuit to generate an ignition signal to ignite a fuel mixture present in the combustion compartment in accordance with one of an interference of the first member with the first interference structure and an interference of the second member with the second interference structure respectively.

In a second aspect of the present invention, there is provided An engine that comprises: a toroidal chamber; an energy supply connected to the toroidal chamber; a drive shaft; a first crank assembly having first pair of pistons and a first interference structure; a second crank assembly having a second pair of pistons and a second interference structure, the first crank assembly and the second crank assembly being arranged about the drive shaft, the first pair of pistons and the second pair of pistons being interposed between each other to form variable volume compartments, the first crank assembly and the second crank assembly being rotatable substantially only in a single rotation direction; first coupling means for transmitting torque from the first crank assembly directly to the drive shaft, to rotate the drive shaft in the rotation direction; first backstopping means to immobilize the second crank assembly, with respect to the casing, when the first coupling means transmits torque from the first crank assembly to the drive shaft; second coupling means for transmitting torque from the second crank assembly directly to the drive shaft to rotate the drive shaft in the rotation direction; second backstopping means to immobilize the first crank assembly, with respect to the casing, when the second coupling means transmits torque from the second crank assembly to the drive shaft; and a system to alternately stop a rotation of the first crank assembly upon the first pistons being in a pre-determined position and a rotation of the second crank assembly upon the second pistons being in the pre-determined position, the system having a first member and a second member to interfere respectively with the first interference structure and the second interference structure, the first member to temporarily stop the first crank assembly at the pre-determined position upon the first member interfering with the first interference structure, the second member to temporarily stop the second crank assembly at the pre-determined position upon the second member interfering with the second interference structure, the system further having an electrical circuit operationally connected to first member and to the second member, to generate an actuation signal to actuate a delivery of energy from the energy supply to one variable volume compartment in accordance with one of an interference of the first member with the first interference structure and an interference of the second member with the second interference structure respectively.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 5A-5F show various stages of torque transfer in an embodiment of the toroidal engine of the present invention;

FIGS. 5G-5I shows an alternate embodiment of the toroidal engine of the present invention;

FIGS. 14A-14C show a ring with interference structures formed thereon;

FIGS. 15A-15D show yet another embodiment, and portions thereof, of the toroidal engine of the present invention;

DETAILED DESCRIPTION

Generally, the present invention provides a toroidal engine. The toroidal engine can be a toroidal internal combustion engine powered by a fuel/air mixture, or a toroidal pneumatic engine powered by a compressed gas source. The toroidal engine, whether powered by a fuel/air mixture or by a compressed gas, uses one-way bearings to transfer torque generated in a toroidal chamber directly to a drive shaft. Pairs of pistons are mounted on two crank assemblies, which are concentric with the drive shaft. One-way bearing assemblies allow the crank assemblies to turn, one at a time, in one direction only and to latch onto the drive shaft to turn the drive shaft. The crank assemblies are directly coupled to the drive shaft, which eliminates the need for complex gear and linkage arrangements. The present invention further provides, for the toroidal engine powered by a fuel/air mixture, a mechanical fuel ignition timing mechanism, and, for the toroidal engine powered by a compressed gas source, an air injection timing mechanism.

Figure 2:
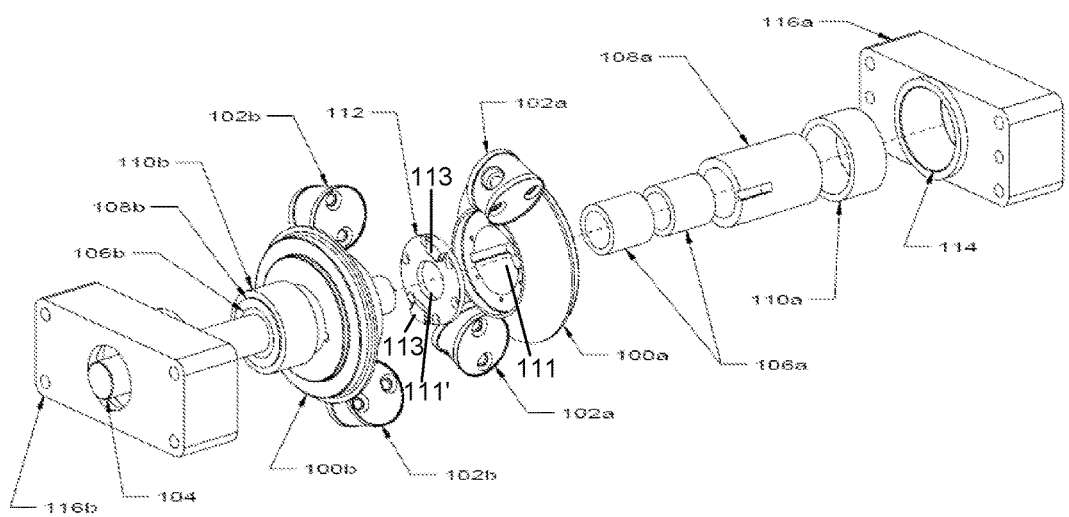
FIG. 2 shows an exploded view of an embodiment of a toroidal engine of the present invention.

FIG. 2 shows an exploded view of components comprised in an exemplary embodiment of a toroidal internal combustion engine of the present invention. The toroidal internal combustion engine can also be referred to as a Rotational Impact Internal Combustion Engine (RIICE). FIG. 2 shows two cranks 100a and 100b, each crank having secured thereto two diametrically disposed pistons 102a and 102b respectively. Each crank (100a, 100b) and its respective pistons (102a, 102b) can be referred to as a crank assembly. Each piston 102a is interposed between two pistons 102b and, each piston 102b is interposed between two pistons 102a. Each crank can include an impact ring 112 that prevents the pistons 102a from hitting the pistons 102b. The impact rings are designed to prevent damage to the pistons and to promote energy transfer between them during start up as well as to transfer kinetic energy between the cranks when the engine is in operation. In the present example, each impact ring 112 has a pair of wedge-shaped protrusions 113, each protrusion having an angular width larger than that of the pistons, to prevent the pistons 102a from directly impacting the pistons 102b. Each impact ring 112 can be secured to its respective crank through any suitable means such as, for example, fasteners.

The pistons 102a and 102b can be secured to their respective cranks 100a and 100b by screws or any other suitable fasteners. Although each crank (100a, 100b) in the exemplary embodiment on FIG. 2 is shown as having two pistons (102a, 102b), any suitable number of pistons secured to each crank is also within the scope of the present invention. Also shown at FIG. 2 is a drive shaft 104 and indexing one-way bearings 106a and 106b. The indexing one-way bearings 106a and 106b, which can also be referred to as driving one-way bearings, are disposed over the drive shaft 104. Sleeves 108a and 108b are disposed over, and fixedly secured to, respective indexing one-way bearings 106a and 106b. Backstopping one-way bearings 110a and 110b are disposed over respective sleeves 108a and 108b. The backstopping one-way bearings 110a and 110b fit in holes 114 defined in pillow block 116a and 116b, and are fixedly secured to their respective pillow block, which can also be referred to as a bearing housing. The sleeve 108a and 108b fit in bores 111, which can also be referred to as circular bores or holes, defined in each crank 100a and 100b. The impact rings 112 each have a bore 111'. The drive shaft 104 extends through the bores 111 and 111'.

Each crank 100a and 100b is fixedly secured to respective sleeves 108a and 108b through any suitable means such as, for example, keyways, interference fit, press-fit, etc. The bores 111' in the impact rings 112 is for clearance around the drive shaft 104. The bores 111' are smaller than the bores 111 in the cranks, but larger than the diameter of the drive shaft 104. Therefore, the impact rings 112 can also act as a shoulder on their respective crank to hold the sleeves axially, as the sleeves are tightened inwards by pillow blocks. Although not shown at FIG. 2, there can be thrust bearings between the sleeves and the pillow blocks and between the two impact rings. These thrust bearings can carry the thrust load produced by the axial tension on the pillow blocks. The exemplary toroidal internal combustion engine of FIG. 2 can be secured to any suitable framework through mounts (not shown). The pillow blocks 116a and 116b can also be used to house external radial ball bearings. These radial ball bearings take the radial load applied to the indexing and backstopping one-way bearings and they keep the drive shaft true with respect to the cranks and one-way bearings.

Figure 3:
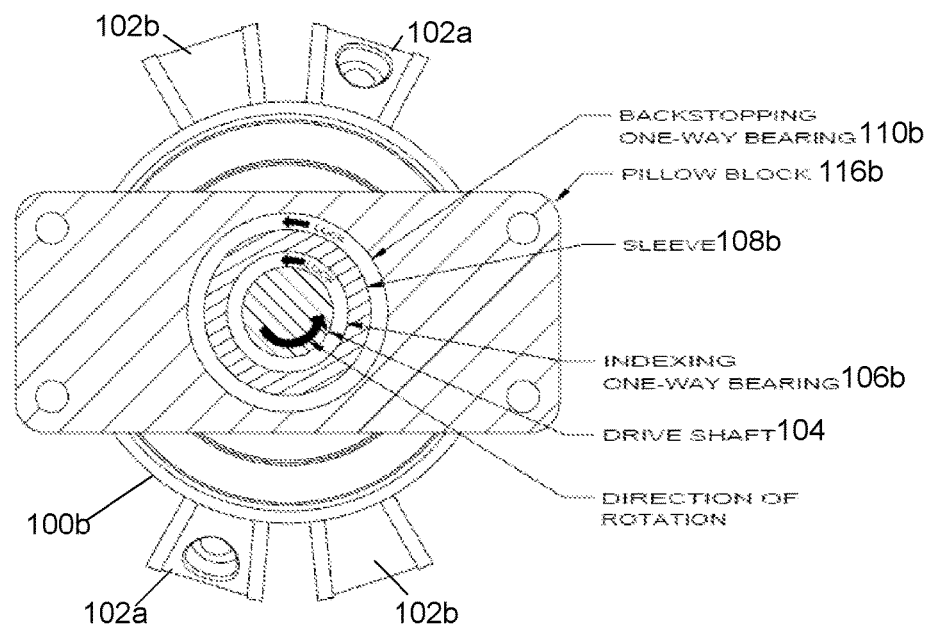
FIG. 3 shows a front view of components of an embodiment of the toroidal engine of the present invention.
Figure 4:
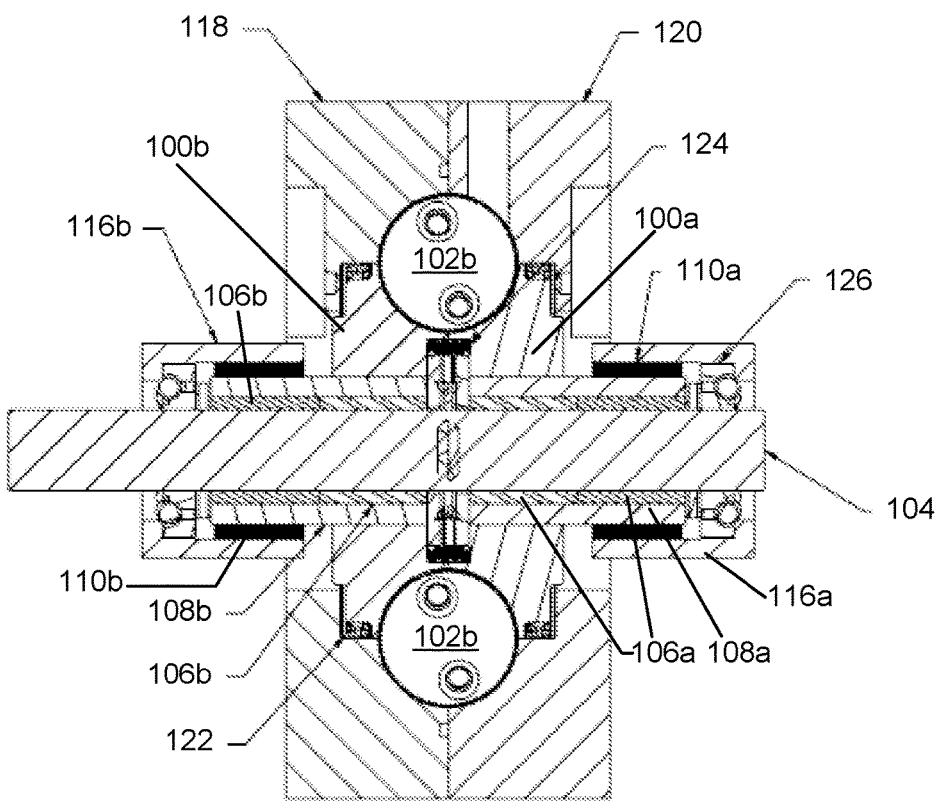
FIG. 4 shows a side cross-sectional view of an embodiment of the toroidal engine of the present invention.

FIG. 3 shows an end view of the pillow block 116b. FIG. 4 shows a cross-sectional view of the toroidal internal combustion engine of FIG. 2 with a front casing 118 and a back casing 120 disposed over respective cranks 100b and 100a. Also shown at FIG. 4 is an inner seal 124, an outer seal 122, and a radial ball bearing 126. The cranks 100a and 100b, the front casing 118 and the back casing 120 define a toroidal chamber in which the pistons 102a and 102b can rotate about the drive shaft 104. The front casing 118, the back casing 120 can be said to form the housing of the exemplary internal combustion engine shown at FIGS. 2-4. The pillow blocks 116a and 116b can be fixedly secured, for example, through any suitable fasteners, to the housing. Although the exemplary internal combustion engine of FIGS. 2-4 are shown as having two sleeves per crank assembly, any suitable number of sleeves can be used without departing from the scope of the present invention.

The backstopping one-way bearings 110a and 110b have their outside perimeter fixedly secured to their respective pillow blocks 116a and 116b. That is, the outside race structure of the backstopping one-way bearings 110a and 110b are fixedly secured to their respective pillow blocks 116a and 116b. This can be achieved, for example, by press-fitting the backstopping one-way bearings into their respective pillow blocks. The inside perimeter of the backstopping one-way bearings 110a and 110b includes rollers that contact the outer perimeter of their respective sleeves 108a and 108b to allow their respective sleeves 108a and 108b, and their respective cranks 100a and 100b, to rotate in one and the same direction only (e.g., counterclockwise direction), and to prevent rotation in the opposite direction (e.g., clockwise direction). The indexing one-way bearings 106a and 106b (the driving one-way bearings) have their outside perimeter fixedly secured to the inner perimeter of their respective sleeves 108a and 108b. That is, the outside race structure of the indexing one-way bearings 106a and 106b are fixedly secured to the inner perimeter of their respective sleeves 108a and 108b. This can be achieved, for example, by press-fitting the indexing one-way bearings 106a and 106b into their respective sleeves. The inside perimeter of the indexing one-way bearings 106a and 106b includes rollers that contact the drive shaft 104 and can latch onto the drive shaft 104 when their respective sleeves 108a and 108b rotate in the rotation direction allowed by the backstopping one-way bearings 110a and 110b (e.g., counterclockwise direction, as shown at FIG. 3). The inside perimeter of the indexing one-way bearing 106a and 106b allow the drive shaft 104 to rotate when their respective sleeves 108a and 108b are immobile with respect to their respective pillow blocks 116a and 116b, i.e., with respect to the housing of the internal combustion engine.

As shown at FIG. 4, the backstopping bearings 110a and 110b overlap, at least partially, one of the indexing one-way bearings 106a and 106b respectively. This allows for an internal combustion engine with smaller dimensions. Further, also as shown at FIG. 4, each crank 100a and 100b (crank assembly 100a/102a, crank assembly 100b/102b) overlaps, at least partially, one of the indexing one-way bearings 106a and 106b respectively. This also allows for an internal combustion engine with smaller dimensions.

FIGS. 5A-5F show how the toroidal internal combustion engine exemplary embodiment of FIGS. 2-4 functions. As shown at FIG. 5C, the toroidal chamber has four variable volume compartments 1, 2, 3, and 4, each such compartment being comprised between adjacent pairs of pistons. FIG. 5A shows the toroidal chamber 127. Pistons 102a are secured to crank 100a, pistons 102b are secured to crank 100b. At FIG. 5A, a compressed fuel/air mixture 128, present in a section of the toroidal chamber 127 and comprised between the topmost pistons 102a and 102b, is ignited by a spark unit 130, which can also be referred to as an ignition unit, which can include, for example, a spark plug. The section of the toroidal chamber 127 comprised between the topmost pistons 102a and 102b, that is the section of the toroidal chamber in which the fuel/air mixture is ignited and combusts, can be referred to as the combustion compartment. At FIG. 5A, the topmost piston 102a can be referred to as the back piston, and the topmost piston 102b can be referred to as the front piston. The spark unit 130 can be secured to an opening defined, for example, in the front casing 118 or the back casing 120. As such, the spark unit 130 can ignite the fuel/air mixture 128 present in the combustion compartment. The explosion of the fuel/air mixture 128 causes a force to develop between the topmost pistons 102a and 102b.

The backstopping one-way bearing 110a (FIGS. 2-4) disposed between the sleeve 108a, to which the crank 100a is fixedly secured, and its respective pillow block 116a, prevents the crank 100a and its pistons 102a from rotating in one direction (clockwise direction in FIG. 4) upon action of the aforementioned force. However, pistons 102b and the crank 100b to which they are secured are allowed to rotate in the opposite direction (counterclockwise direction in FIG. 4) upon action of the force. The indexing one-way bearings 106b disposed between the drive shaft 104 and the sleeve 108b, to which the crank 100b carrying the pistons 102b is fixedly secured, engage the drive shaft 104 upon the pistons 102b being subjected to the aforementioned force, and thereby transmit torque produced by the force generated in the toroidal chamber to the drive shaft 104.

FIG. 5B shows, at reference numeral 132, the expansion of the exploded fuel/air mixture. That is, the variable volume compartment (combustion compartment) defined in the toroidal chamber, between the two topmost pistons of FIG. 5A (102b, 102a), is shown, at FIG. 5B, as expanded relative to its configuration of FIG. 5A. FIG. 5C shows, at reference numeral 134, how the combustion products resulting from a fuel/air mixture ignition having occurred immediately before that shown at FIG. 5A are evacuated through an exhaust aperture 136. FIG. 5D shows, how a fresh fuel/air mixture is drawn into the toroidal chamber 127 through an intake aperture 140. FIG. 5E shows, at reference numeral 142, how a fresh fuel/air mixture inserted into the toroidal chamber through intake 140, during the previous internal combustion cycle is compressed. Each step of the internal combustion cycle (expansion, exhaust, intake, and compression) depicted at FIGS. 5B to 5E occur simultaneously.

Upon compression of the fresh fuel/air mixture at 142 (FIG. 5E), pressure will build up being the topmost piston 102b and the topmost piston 102a will move in the counterclockwise direction beyond the spark unit 130. This is shown at FIG. 5F. At that point, ignition of the fresh fuel/air mixture occurs and the process shown at FIGS. 5B-5E repeats.

In the example shown at FIGS. 5A-5F, one set of pistons can rotate approximately 170° during one cycle, while the other set can rotate about 10°. FIGS. 5A-5F shows that the piston 102b with the black dot has rotated 170° while the pistons 102a have rotated 10°. Thus, in the example illustrated at FIGS. 5A-5F, for one piston to complete one full revolution it will require four cycles, i.e., four ignitions.

The toroidal internal combustion engine embodiment of the present toroidal engine invention can be powered by any suitable fuel. For example, the toroidal internal combustion engine embodiment, as shown in the embodiment of FIGS. 5A-5F, could be powered by, gasoline, ethanol, hydrogen or any other appropriate fuel that can be provided to the engine though the intake 140. Alternatively, the exemplary toroidal engine of FIGS. 5A-5F could be adapted to be powered by diesel fuel through simple modifications including, for example, replacing the spark unit 130 with a diesel fuel injector and providing a glow plug to warm the combustion chamber and providing air through the intake 136.

Although the present invention has been thus far described in relation to toroidal internal combustion engine embodiments, the skilled worker will appreciate that replacing the spark unit 130 with a compressed gas source would enable the present invention to function as a toroidal pneumatic engine. In such toroidal pneumatic engine embodiments, the exhaust port 136 of FIG. 5C would still be functional, allowing low pressure air to exhaust to atmosphere after each impulse of air. The intake port 140 would draw air in from the atmosphere to be compressed during the compression stroke as described above. Such compressed air would facilitate the rotation of the back piston of the previous cycle, now the forward piston, into the "ignition" position (compressed gas intake position in the toroidal pneumatic engine embodiment). FIGS. 5G-5I show another embodiment of a toroid pneumatic engine 898 that has two exhaust ports 900 and two compressed air inputs 902. The compressed air inputs provide compressed air to the toroid engine 898 in accordance with a respective valve 904 (e.g., a solenoid valve), which can be opened and closed by a controller.

Figure 1:
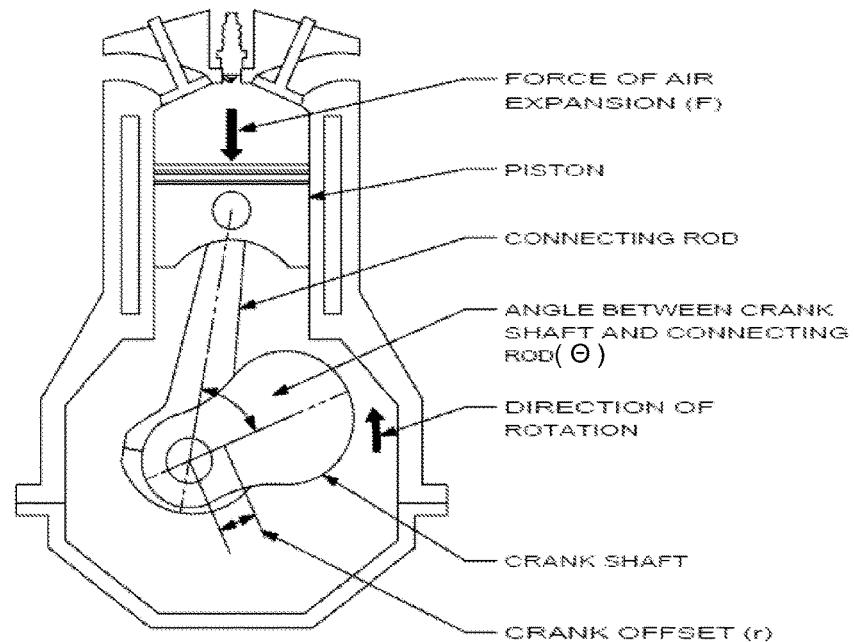
FIG. 1 shows a prior art internal combustion engine.
Figure 6:
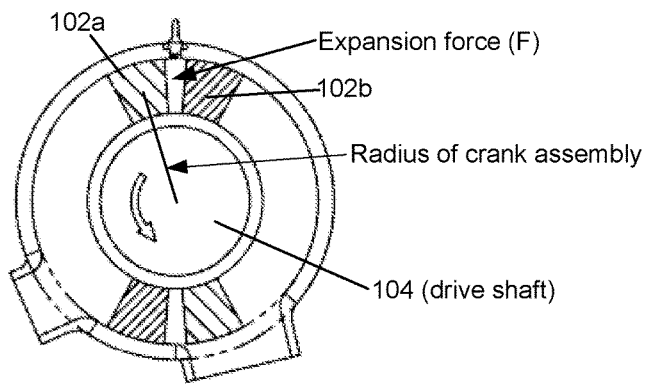
FIG. 6 shows an expansion force being applied on a piston of an embodiment of the toroidal engine of the present invention.
Figure 7:
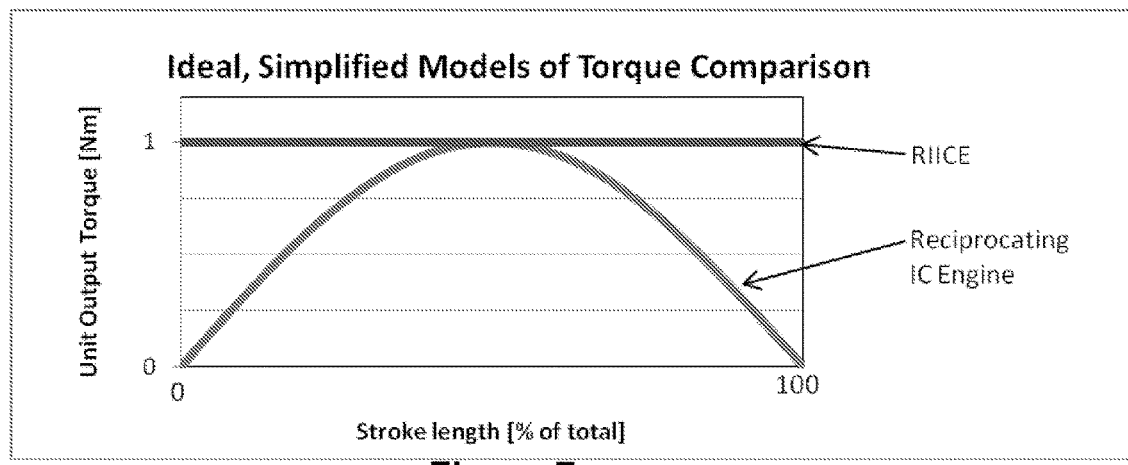
FIG. 7 shows a comparison of an ideal simplified model of the torque between a reciprocating internal combustion engine and an embodiment of the toroidal engine of the present invention.

FIG. 6 and FIG. 7 show the advantage, in terms of torque, of the toroidal internal combustion engine embodiment of the present toroidal engine invention over conventional internal combustion engines such as the one shown at FIG. 1. At FIG. 6, the expansion force caused by the ignition of the fuel/air mixture is always substantially perpendicular to the piston. As such, equation 1 becomes, for the present example of the toroidal internal combustion engine of the present invention:

$$T = rF \qquad \text{(Equation 2)}$$

Thus, for the toroidal internal combustion engine of the present invention, the torque is constant throughout the entire length of the stroke (about 170° in the present embodiment). This advantage is graphically represented at FIG. 7, which compares the torques of a conventional internal combustion engine (half sine wave-reciprocating IC engine) to the toroidal internal combustion engine of the present invention (straight line toroidal internal combustion engine of the present invention, as exemplified at FIGS. 5A-5F) over a full stroke length. FIG. 7 does not take into account frictional losses or thermodynamic cycle.

Figure 8:
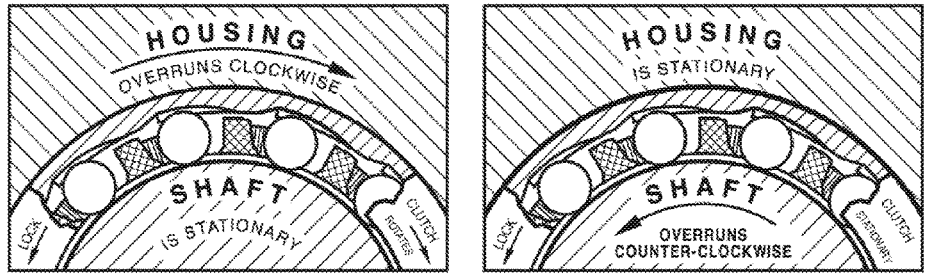
FIGS. 8 and 9 show examples of one-way bearings that can be used in an embodiment of the toroidal engine of the present invention.
Figure 9:
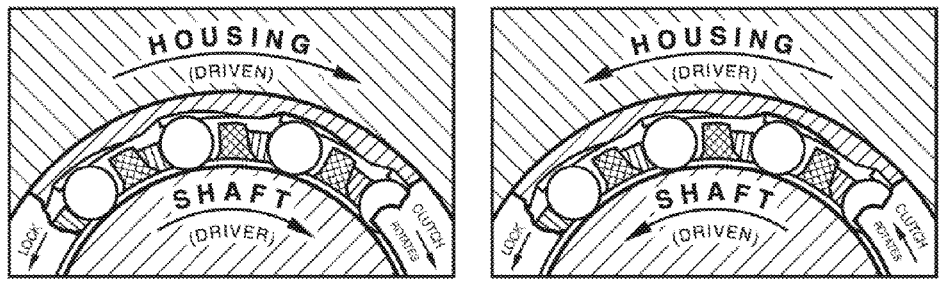

As described above, indexing one-way bearings (driving one-way bearings) and backstopping bearings can be used in toroidal internal combustion engine and toroidal pneumatic engine embodiments of the present invention. One-way bearings, work on the principle of opposite relative motion. If no opposite motion exists between a drive shaft and a housing, the one-way bearing is overrunning and does not transmit torque, either from the drive shaft to the housing or from the housing to the drive shaft. With respect to FIG. 8 and FIG. 9, obtained from Torrington Service Catalogue (2001), when opposite relative motion exist between the shaft (drive shaft) and housing, the one-way bearing latches to the drive shaft and begins transmitting torque between the drive shaft and the housing. The one-way bearings used in the toroidal engine of the present invention is such that the one-way bearings (the backstopping bearings 110a and 110b, and the indexing one-way bearings 106a and 106b) do not have an inner race. The rollers of the indexing one-way bearings 106a and 106b roll directly on the drive shaft 104, with a cage keeping the rollers in place with respect to the outer race, which can also be referred to as the outer race structure, it is fixedly secured to the inner perimeter of the respective sleeves 108a and 108b. FIG. 9 shows that the outer race of the one-way bearings includes a series of ramps located over each roller. When opposite relative motion is applied either to the shaft or housing, the rollers climb their respective ramp and eliminate any clearance that existed between the shaft, rollers and housing. Without any clearance, the rollers can no long rotate, thereby forming a solid link between the shaft and housing. This type of one-way bearing can require a hardened and precisely ground shaft to prevent substantial damage to the shaft and to the bearing.

As described above, one-way bearings serve two fundamental functions in the toroidal engine of the present invention. First, in the case of the toroidal internal combustion engine, during the ignition and expansion cycle, the backstopping one-way bearings (e.g., 110a, which has its rollers in direct physical contact with the outer perimeter of the sleeve 108a and its outer race structure fixedly secured to the pillow block 116a), prevent the reverse rotation of the back piston (e.g., 102a). As the expanding combusting fuel/air mixture fills the space between the topmost pistons 102a and 102b shown at FIG. 5B the forward piston (102b) is pushed forward while the back piston is restrained by the backstopping one-way bearing (110a). As described previously, the pistons 102a and the pistons 102b are fixedly secured to separate cranks 100a and 100b respectively. Each crank and piston assembly, which can be referred to as a crank assembly, rotates at separate time intervals with relative motion between the two crank assemblies. That is, the two crank assemblies (100a and 102a, 100b and 102b) shown in the example of FIG. 2, rotate intermittently. The two pistons on each crank rotate with their respective crank and there is no relative motion between the pistons located on the same crank.

The second function of the one-way bearings is to transmit the torque generated in the toroidal chamber 127 shown at FIG. 5A. As described above, the force of expansion on the pistons (102a, 102b) applies torque to the drive shaft 104. Since the mechanism goes through different cycles, the cranks 100a and 100b transmit torque to the shaft intermittently through the indexing one-way bearings 106a and 106b. Exemplary embodiments of the internal combustion engine of the present invention is such that the individual cranks 100a and 100b apply torque to the drive shaft 104 separately, at different times. Indexing one-way bearings 106a and 106b are used to apply torque to the drive shaft 104, yet still allowing the drive shaft 104 to continue its rotation when no torque is applied.

As will be understood by the skilled worker, the torque output of a one-way bearing will generally depend on: (a) the manufacturing tolerances; (b) the hardness of the rollers; and, (c) the diameter of the bearing. The diameter of the bearing limits the diameter of the rollers, and the number of rollers. Larger diameter rollers can carry larger loads, and the number of rollers increases the load capacity of the one-way bearing linearly. Generally, a value of the maximum torque capacity relative to the diameter of the bearing can be expressed as $T=aD^x$; where "T" is the maximum torque capacity; "a" is a constant; "D" is the diameter of the one-way bearing; and "x" is a variable which depends on the manufacturer and specific bearing. Typically, "x" will range between 2 and 3. Therefore, for Ni indexing and Nb backstopping one-way bearings having the same "a" and "x" values, the ratio of the backstopping (Db) to the indexing (Di) one-way bearing diameters that will have matched torque values can be expressed as $Db/Di=(Ni/Nb)^{1/x}$ where Ni is the number of indexing bearings and Nb is the number of backstopping bearings.

The toroidal internal combustion engine of the present invention has been described so far as comprising one-way bearings (backstopping one-way bearings and indexing (or driving) one-way bearings). However, the scope of the present invention also encompasses freewheel mechanisms, ratchet mechanisms, sprag clutch mechanisms, freewheel clutches, overrunning clutches, electromagnetic clutches, needle clutch roller bearing mechanisms, one-way locking roller bearing mechanisms, one-way needle bearing mechanisms, coaster brake mechanism, and friction plate mechanisms, that can be used instead of, or in addition to, the one-way bearing mechanisms described above.

In the toroidal internal combustion engine embodiment, each piston (102a and 102b) is designed to transfer the energy supplied by the expanding combusting fuel/air mixture to the cranks 100a and 100b. Additionally, each piston is designed to transfer energy from the cranks to compress the fresh air/fuel prior to combustion.

Figure 10:
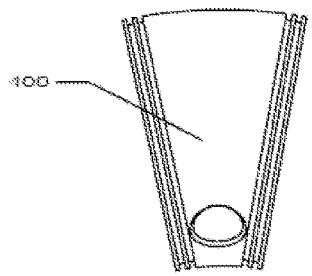
FIG. 10 show an embodiment of a piston for an embodiment of the toroidal engine of the present invention.
Figures 11A, 11B, 11C:
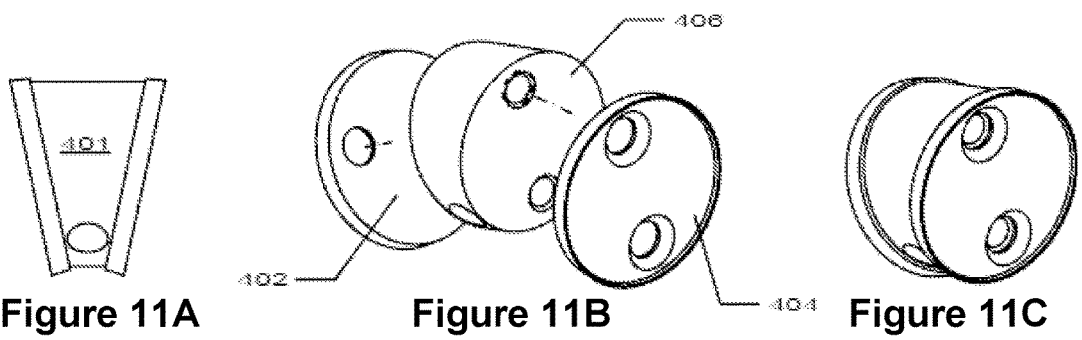
FIGS. 11A-11C show another embodiment of a piston for an embodiment of the toroidal engine of the present invention.

The pistons 102a and 102b can have any suitable shape without departing from the scope of the present invention. For example, circular face pistons can be used. Advantageously, such circular face pistons provide the largest area with the smallest perimeter. The circular face pistons can be monolithic, or compound, and have a radial cross-section that is circular throughout the piston. Such pistons have a shape which is substantially that of a segment of toroid and can be referred to as toroid pistons. An example of such a piston 400 is shown at FIG. 10. Alternatively, the circular face pistons can be a compound pistons made of a number of parts that include two discs (the two circular faces of the pistons), connected by a middle portion of arbitrary radial cross-section. For example, with respect to FIGS. 11A, 11B, and 11C, which show a compound piston 401, two such circular piston faces 402 and 404 can be connected by a beveled portion 406 of a circular cylinder. The circular pistons faces can be secured to the beveled portion 406 through any suitable fastener. Advantageously, such compound pistons can be easier to manufacture than the aforementioned pistons that have circular radial cross-section throughout. The pistons 400 and 401 can be made of any suitable material, including, for example, aluminum alloys with high silicon additions such as 4032 or little silicon such as 2618. Aluminum can be advantageous because of its strength-to-weight ratio and relatively low cost. Silicon additions reduce the piston thermal expansion due to heat while high strength alloys such as 2618 are intended for aggressive high-power applications. Iron and steel can also be used. For the toroidal pneumatic engine, acetal and any other resilient hard plastics can be used.

Piston rings made of any suitable material can be used to seal the perimeter of the pistons in the toroidal chamber (127, FIG. 5A).

Figure 12A:
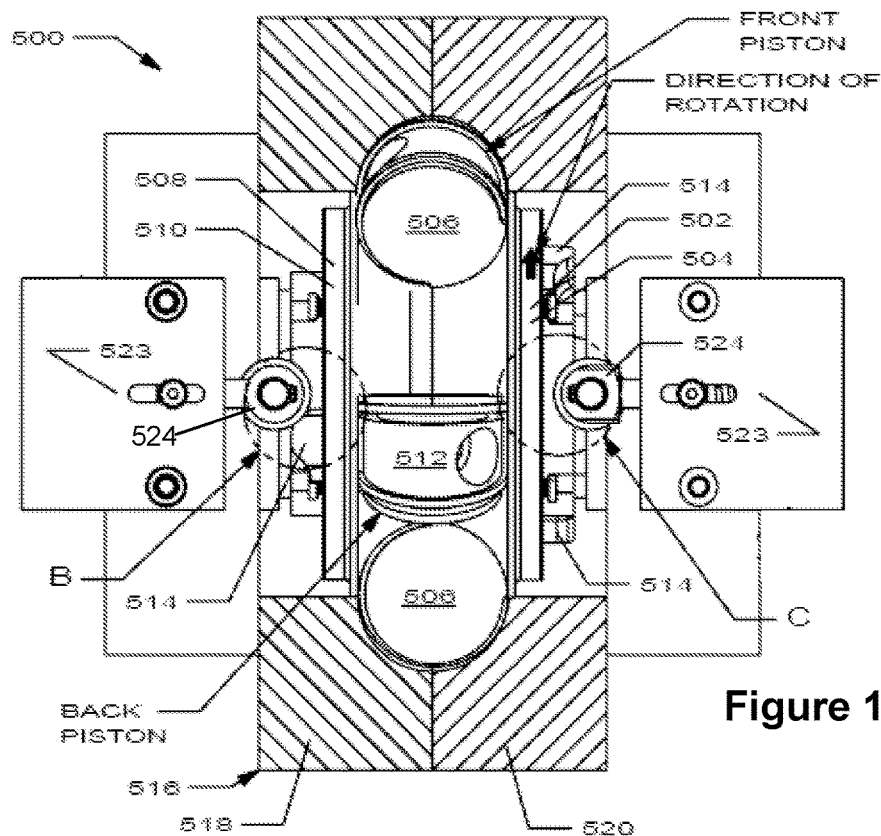
FIGS. 12A-12C show another embodiment, and portions thereof, of the toroidal engine of the present invention.
Figure 12B:
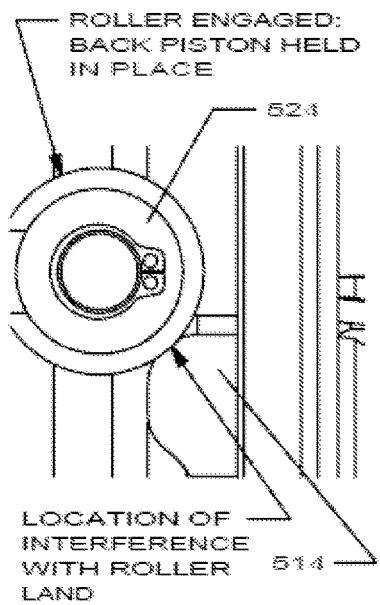
Figure 12C:
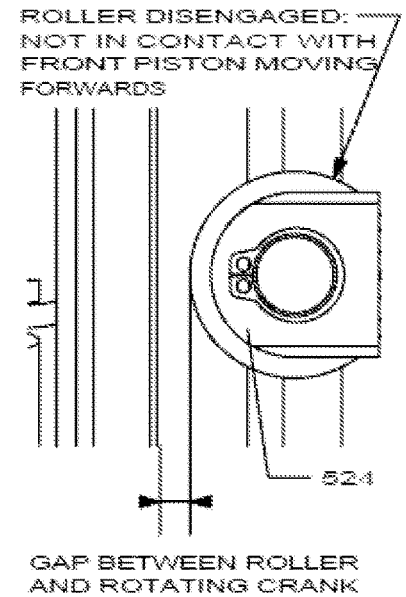

FIG. 12A, FIG. 12B, and FIG. 12C show an alternate embodiment the toroidal chamber internal combustion engine of the present invention. The internal combustion engine 500 of FIG. 12A is similar to that shown in the exploded view of FIG. 2, but with an additional system, shown at reference numeral 522 in the block diagram of FIG. 13. The system 522 alternately stops the cranks (crank assemblies) at a predetermined position and times the ignition of the fuel in the combustion compartment. Details of the system will be described further below.

As shown in the partial cross-sectional view of FIG. 12A, the internal combustion engine 500 has a first crank assembly 502 that includes a first crank 504 and first pistons 506. The internal combustion engine 500 also includes a second crank assembly 508 that includes a second crank 510 having secured thereto second pistons 512, only one of which is shown at FIG. 12A. In the present example, the first crank assembly 502 and the second crank assembly 508 each have a pair of diametrically opposed pistons secured thereto.

The internal combustion engine 500 has a housing 516 that houses the first crank assembly 502 and the second crank assembly 508. The housing 516 includes a first casing 518, a second casing 520. Although not shown at FIG. 12A, the housing 516 can have formed thereon, or secured thereto, pillow blocks similar to pillows blocks 116a and 116b in the exemplary embodiment of FIG. 2. The housing 516, the first crank assembly 502, and the second crank assembly 508 define the toroidal chamber of the internal combustion engine 500.

Although not shown at FIG. 12A, the internal combustion engine 500 comprises a drive shaft, such as drive shaft 104 shown at FIG. 2, that is operationally coupled to the first crank assembly 502 and to the second crank assembly 508, for example, through driving one-way bearings and sleeves such as shown at reference numerals 106a, 106b, 108a, and 108b of FIG. 2. As in the example of FIG. 2, the first crank assembly 502 and the second crank assembly 508 are operationally coupled to the drive shaft to turn the drive shaft in a pre-determined direction. Also as in the example of FIG. 2, the housing 516 is operationally coupled to the first crank assembly 502 and to the second crank assembly 508 to prevent the first crank assembly 502 and the second crank assembly 508 from turning in a direction opposite the pre-determined direction. The housing 516 can be operationally coupled to the first crank assembly 502 and to the second crank assembly 508 through backstopping one-way bearings, sleeves, and pillow blocks such as shown reference numerals 110a, 110b, 108a, 108b, 116a, and 116b at the example of FIG. 2.

Although not shown at FIG. 12A, each of the first crank assembly 502 and the second crank assembly 508 can have formed thereon an impact feature such as the impact ring 112, and its protrusions 113, shown at FIG. 2. In such an embodiment, the impact ring of one crank assembly impacts the impact ring of the other crank assembly and transfers momentum thereto. For example, in the case where the second crank assembly 508 is immobile (and comprises an impact ring) and the first crank assembly 502 is rotating (and also comprises an impact ring), the impact ring of the first crank assembly 502 will impact the impact ring of the second crank assembly 508 and transfer momentum thereto. After impact, the first crank assembly 502 may continue to rotate because, for example, increasing pressure on the backside of one of its pistons due to a fresh fuel/air mixture being compressed. This process repeats with the impact ring of the second crank assembly 508 impacting the impact ring of the first crank assembly 502. The extent of this post-impact rotation of the impacting crank assembly may vary between crank assemblies and between successive impacts. This can produce unevenness in the operation of the internal combustion engine 500 in that the volume of the combustion compartment, and the amount of torque generated in the combustion compartment, may vary from impact to impact (i.e., from combustion to combustion).

Figure 13:
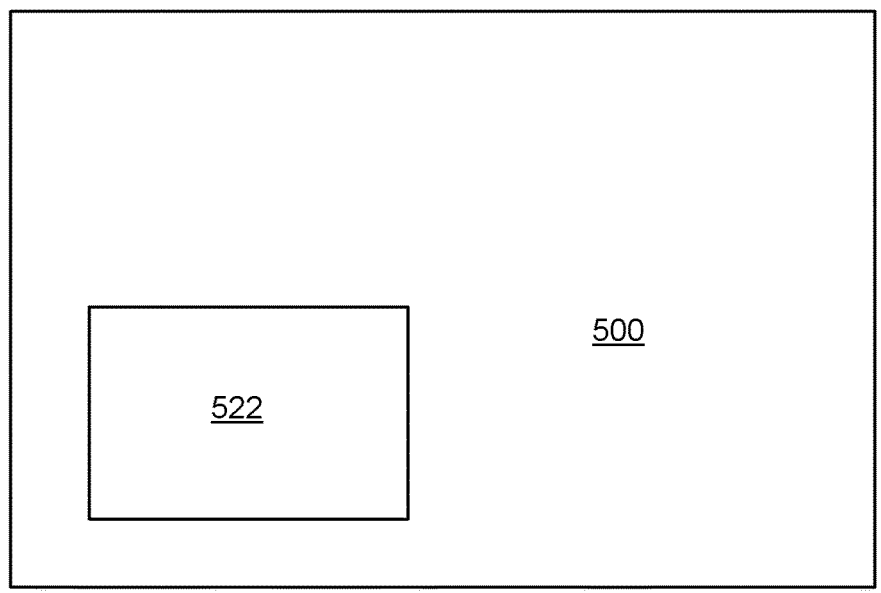
FIG. 13 shows a block diagram representing a toroidal engine of the present invention with a system to alternately stop the cranks and time the ignition.

To mitigate this effect, the exemplary internal combustion engine 500 includes, as stated above, the system 522 shown in the block diagram of FIG. 13. The system 522 alternately stops the first crank assembly 502 and the second crank assembly 508, at a pre-determined position (that is, with one of the pistons of the first crank assembly or of the second crank assembly at a pre-determined position), after impact of the first crank assembly 502 with the second crank assembly 508 and after impact of the second crank assembly 508 with the first crank assembly 502 respectively. The system 522 can also be used as a timing means to time the generation of an ignition signal to ignite fuel present in the combustion compartment of the toroidal cylinder (chamber).

With reference to FIG. 12A, the system 522 can include a pair of interference structures, such as interference structures 514, which can be protrusions of any suitable shape, formed on each of the first crank assembly 502 and the second crank assembly 508. The interferences structures 514 rotate as do their respective crank assemblies. The system 522 can also includes a pair of mechanical assemblies 523, each secured to the housing 516 through any suitable means such as, for example, fasteners. Each mechanical assembly 523 is adjacent a respective crank assembly and includes a member, for example a roller assembly 524, that interferes with a respective interference structure 514 formed on its respective crank assembly, as the respective crank assembly continues to rotate after having impacted the other crank assembly. An example of such a mechanical assembly is described below.

As the second crank assembly 508 rotates and impacts the first crank assembly 502, the first crank assembly 502 will accelerate and start turning as the second crank assembly 508 decelerates, but nevertheless continues to rotate. As the second crank assembly 508 continues to rotate, its respective roller assembly 524 will interfere with a protrusion (interference structure 514) formed on the second crank assembly 508 and temporarily stop, at the pre-determined position, the second crank assembly 508 from turning. The shown piston 512 of the temporarily stopped second crank assembly 508 of FIG. 12A acts as the back piston of the combustion chamber of the toroidal internal combustion engine and will be stopped, substantially at the same position (the predetermined position), subsequent every second time the first crank assembly 508 impacts the second crank assembly 502 (this occurs every second time the second crank assembly 508 impact the first crank assembly 502 because each crank assembly has two pistons secured thereto).

For greater certainty, as used herein, expressions such "the first crank assembly impacting the second crank assembly" is to be understood as meaning that the first crank assembly is rotating and that it hits (impacts) the second crank assembly which is substantially immobile at the time of impact.

The position of the roller assemblies 524 with respect to the interferences structures 514, and of the interference structures 514 with respect to their respective pistons, are chosen such that each crank assembly will be stopped, at the pre-determined position, every time one of its pistons is to function as the back piston of the combustion compartment.

FIG. 12B shows a detailed view of feature A of FIG. 12A. FIG. 12C shows a detailed view of feature B of FIG. 12A. FIG. 14A shows a perspective view of an exemplary ring 600 that can be secured to the first crank assembly 502. The ring 600 includes the protrusion 514. FIG. 14B shows a top view of the ring 600. FIG. 14C shows a front view of the ring 600. As will be understood by the skilled worker, the protrusions 514 can be formed directly on the first and second crank assemblies, instead of on the rings 600 (which have to be secured to the first and second crank assemblies) without departing from the scope of the present invention.

Figure 15D:
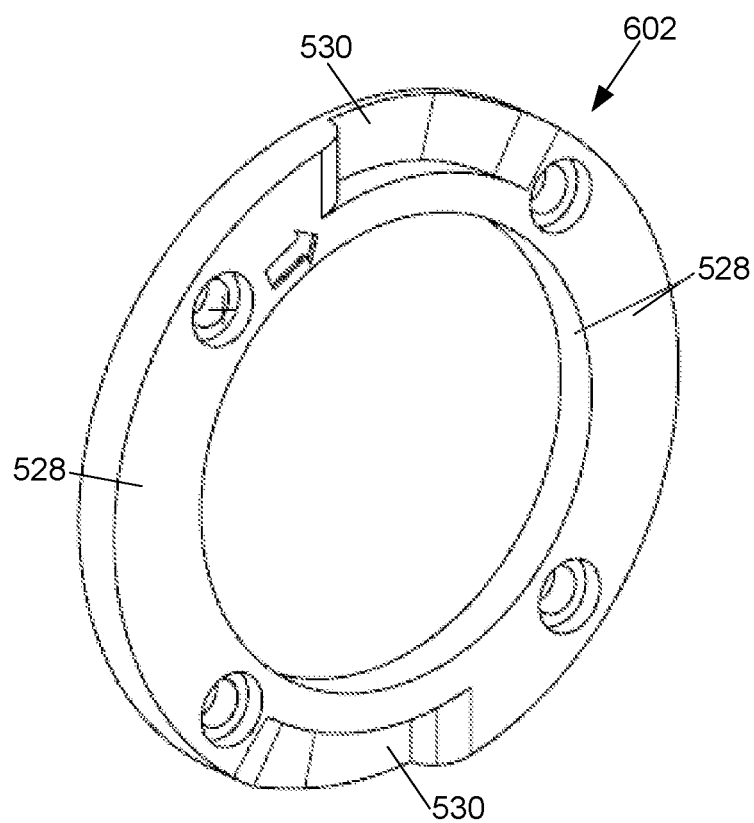

FIG. 15A shows a variation of the internal combustion engine 500 of FIG. 12A. In the example of FIG. 15A, each of the first crank assembly 502 and the second crank assembly 508 has formed thereon a pair of interference structures that can include a land 528 with a recess 530 of any suitable shape. FIG. 15B shows a detailed view of feature C of FIG. 15A. FIG. 15C shows a detailed view of feature D of FIG. 15A. FIG. 15D is a perspective view of an exemplary ring 602 that can be secured to the first crank assembly 502. The ring 602 includes a land 528 and a recess 530. The roller of the roller assembly 524 rolls over the land 528 and engages the recess 530 to stop the first crank assembly at the pre-determined position. As will be understood by the skilled worker, the recesses 530 can be formed directly on the first and second crank assemblies, instead of on the rings 602 (which have to be secured to the first and second crank assemblies) without departing from the scope of the present invention.

The exemplary embodiments shown at FIGS. 12A-12C, 14A-14C, and 15A-15D all have roller assemblies that interfere with a protrusion or a recess formed on the crank assemblies. However, alternatives embodiments that have a structure formed/secured to the housing and can interfere with a structure formed on a crank assembly to temporarily stop the crank assembly to generate an ignition signal are also within the scope of the present invention.

Figure 16:
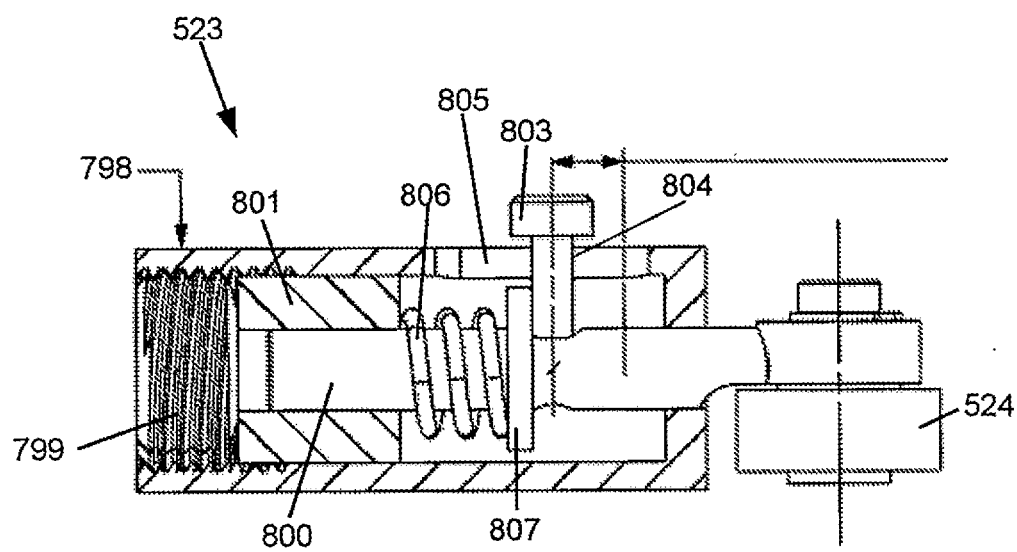
FIG. 16 shows a side cross-sectional view of a mechanical assembly used in an embodiment of the present invention.

FIG. 16 shows a cross-sectional view the exemplary mechanical assembly 523 of the system 522 of the example of FIG. 12A. The mechanical assembly 523 includes a housing 798 and rod 800 to which is secured a roller assembly 524. A rod guide 801 guides the rod 800 as the roller assembly 802 moves in and out of interference with the interference structures of a cranks assembly. A screw 803 is screwed into the rod. The screw passes through a channel 804 defined in the housing 798. The channel 804 allows the rod and its roller assembly to slide back and forth as the roller assembly 524 moves in and out of interference with the interference structures of a cranks assembly. The rod 800 and its roller assembly 524 are biased by a spring 804 disposed between the rod guide 801 and a washer 806 which interferes with the screw 803. The tension is the spring 804 is adjustable through a set screw 799. As will be described below, a switching device can be coupled to the rod/roller assembly such that the rod/roller assembly actuate the switch every time the roller assembly interferes with an interference structure formed on the respective crank assembly.

Alternatives to the mechanical assembly 523, its roller assembly 524, and interference structures formed on the crank assemblies are also within the scope of the present invention. For example, a pair of roller assemblies formed on crank and designed to interfere with a fixed interference structure formed on the housing is within the scope of the present invention.

As will be understood by the skilled worker, roller assemblies such as the roller assembly 524 also constitute interference structures. Generally, any suitable interference structure formed on a crank that can interfere with a complementary interference structure formed on the housing to stop the crank at a pre-determined position and generate an electrical signal to energize an ignition unit is within the scope of the present invention.

In some embodiments, one of the interference structures has stiffness and damping properties in two directions (i.e., one parallel with the axis of the drive shaft, and the other perpendicular to the axis of the drive shaft). An example of such a structure is the mechanical assembly 523 and its roller assembly 524. In some embodiments, one of the interference structures will have a predetermined deflection path, which can be defined by a mechanical linkage and/or the deformation of a solid structure. The deflection of the interference structure allows the crank to pass at the desired time by providing clearance between the two interference structures when a sufficient force is applied by the crank (from impact).

Our current roller fits into this general description as the stiffness and damping in line with the drive shaft is the spring and friction in the mechanical assembly, and the stiffness and damping perpendicular to the drive shaft is in the deformable material of the roller. The angle of the stiffness and damping can be changed by changing the angle that the roller assembly is mounted on the pillow block.

Figure 17:
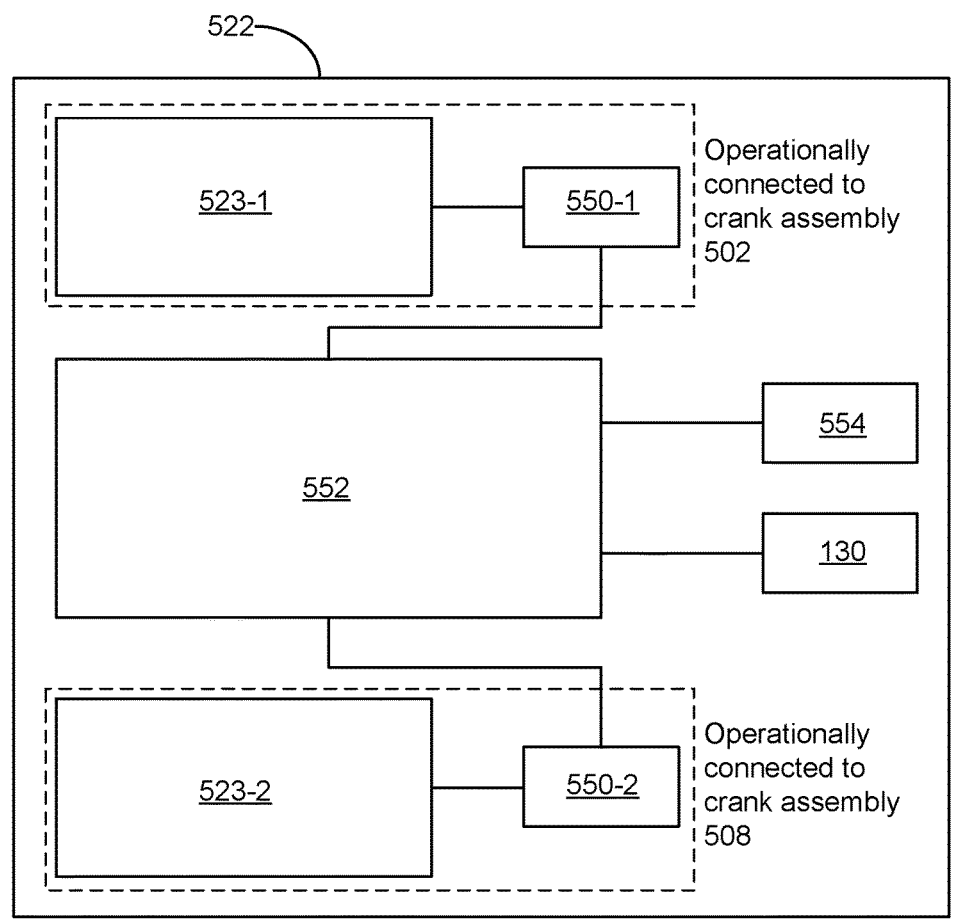
FIG. 17 shows a block diagram of an example of a system that can be used in embodiments of the present invention.

FIG. 17 shows a block diagram view of an example of the system 522. The system 522 includes a mechanical assembly 523-1 connected to a switch 550-1, both of which operationally connected to the first crank assembly 502. The system also includes a mechanical assembly 523-2 connected to a switch 550-2, both of which are operationally connected to the second crank assembly 508. The switches 550-1 and 550-2 are electrically connected to an electrical circuit 552. The electrical circuit 552 is electrically connected to a solenoid valve 554 that controls the intake of fuel in the internal combustion engine. The solenoid valve if to open and close the intake 140 shown at FIG. 5C. The electrical circuit 552 is also electrically connected to the spark unit 130.

The mechanical assemblies 523-1 and 523-2 of the present examples can be the same as the mechanical assembly 523 described above. Upon the roller assembly 524 of the mechanical assembly 523-1 interfering with an interference structure formed on the first crank assembly (e.g. interference structure 514 of FIG. 12A), the roller assembly and its rod 800 and roller assembly 524 will be pushed and will actuate the switch 550-1. The actuation of the switch signals the electrical circuit 552 to open the solenoid valve 554 to provide a fuel/air mixture to the internal combustion engine. The actuation of the switch 550-1 also signals the electrical circuit 552 to ignite the spark unit 130. The disposition of the switch 550-1 relative to the roller mechanism (its rod 800) can be adjusted in accordance to a pre-determined time delay required to ignite the spark unit 130 that optimizes the performance of the internal combustion engine. Additionally, or alternatively, the electrical circuit may contain elements to enable the adjustment of the time delay.

Upon the roller assembly 524 of the mechanical assembly 523-2 interfering with an interference structure formed on the second crank assembly (e.g. interference structure 514 of FIG. 12A), the roller assembly 524 and its rod 800 will be pushed and will actuate the switch 550-2. The actuation of the switch signals the electrical circuit 552 to open the solenoid valve 554 to provide a fuel/air mixture to the internal combustion engine. The actuation of the switch 550-2 also signals the electrical circuit 552 to ignite the spark unit 130. The disposition of the switch 550-2 relative to the roller mechanism (its rod 800) can be adjusted in accordance to a pre-determined time delay required to ignite the spark unit 130 that optimizes the performance of the internal combustion engine.

Figure 18:
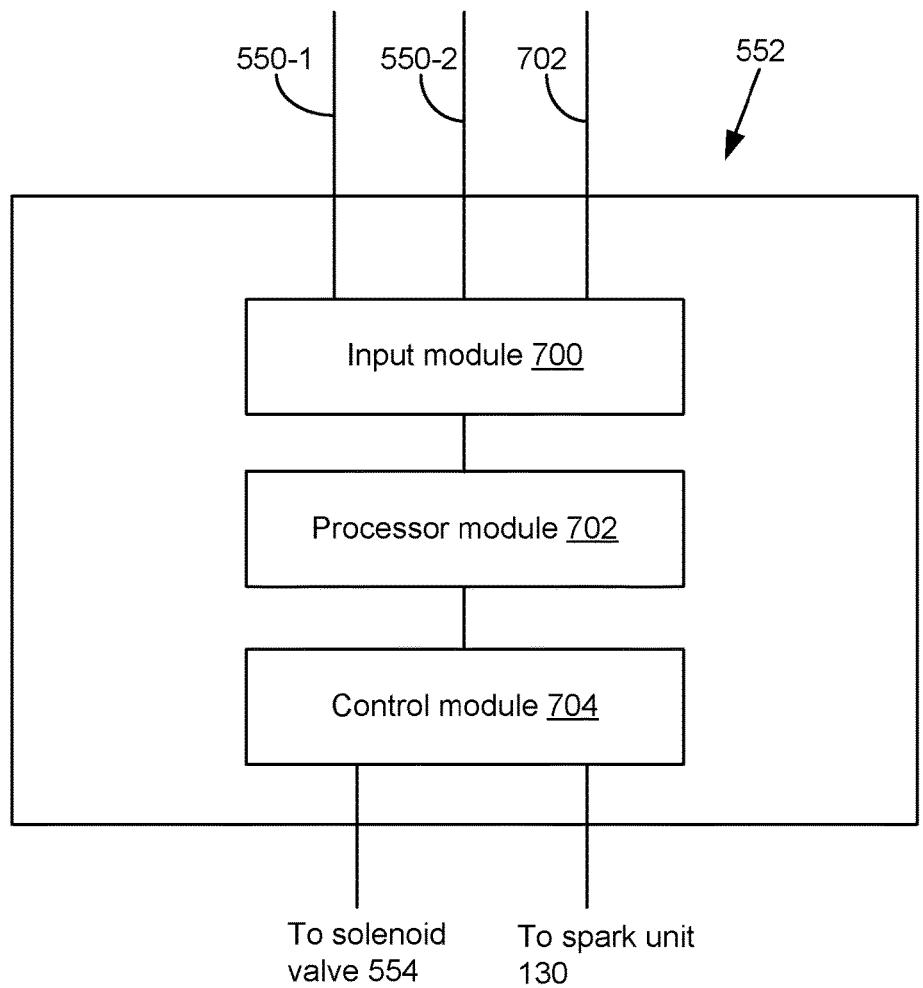
FIG. 18 shows an embodiment of an electrical circuit that can be used in embodiments of the present invention.

FIG. 18 shows an exemplary embodiment of the electrical circuit 552. The electrical circuit 552 has an input module 700 connected to switches 550-1 and 550-2 and to a drive shaft speed input 702. The input module 700 is connected to a processor 702, which is in turn connected to a controller module 704. In accordance with the inputs received at the input module, the controller module 704 can control when the solenoid valve 554 is to be open and for what time interval it is to remain open. The controller module also controls parameters of the spark unit 130 such as, for example, the time at which it is energized subsequent a roller assembly interfering with an interference structure and/or with respect to the time at which the solenoid valve 554 was opened or closed. As will be understood by the skilled worker, additional inputs to the input module, such as, for example, a throttle position, are also within the scope of the present invention.

As will be understood by the skilled worker, another aspect of the present invention is that a plurality of toroidal internal combustion engines of the present invention can be disposed in series to provide torque to a same drive shaft. The design of the toroidal internal combustion engine of the present invention has a small number of moving parts, including two crank/pistons/sleeve assemblies, one drive shaft, and a series of bearing assemblies. Conventional internal combustion engines have a large number of moving parts. By using the toroidal internal combustion engine of the present invention in, for example, hybrid technology, the total number of moving parts would be significantly decreased.

Hybrid vehicle technology typically involves the combination of an internal combustion engine coupled with a battery powered electric motor. Due to constant torque, the toroidal internal combustion engine of the present invention has a higher mechanical efficiency compared to an internal combustion engine, and allows for a smaller size engine that outputs the same amount of power.

As will be appreciated by the skilled worker, the system disclosed above in relation to alternately stopping crank assemblies at a pre-determined position and in relation to timing ignition of the toroidal chamber engine to the embodiments is also applicable to toroid engine other than those described herein. For example, toroidal engine with pistons that are coupled to a drive shaft through complex arrangements of gears and linkages could also use the above-described system.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A toroidal engine configured to be powered by an energy source, comprising:
a housing;
a drive shaft within the housing and rotatable about an axis in a forward direction;
a chamber within the housing and extending about the drive shaft;
an input port fluidly coupled to the chamber for supplying the energy source to the chamber at a first energy level;
an output port fluidly coupled to the chamber for evacuating the energy source from the chamber at a second energy level lower than the first energy level;
first and second cranks coupled to the drive shaft, each of the first and second cranks independently rotatable in the forward direction about the axis for rotating the drive shaft, and each of the first and second cranks inhibited from rotating in a reverse direction opposite the forward direction;
first and second pistons disposed circumferentially about the axis and within the chamber, and fixed to the first and second cranks, respectively, the first and second pistons for transferring energy from the energy source to rotation of the first and second cranks in the forward direction, respectively;
first and second impact protrusions fixed to the first and second cranks, respectively, the first impact protrusion impacting the second impact protrusion during rotation of the first piston toward the second piston in the forward direction for transferring momentum from the first crank to the second crank to urge rotation of the second crank in the forward direction.

2. The engine of claim 1, wherein the energy source comprises externally provided pressurized fluid.

3. The engine of claim 1, wherein the energy source comprises a combustible fuel.

4. The engine of claim 1 further comprising first and second indexing bearings coupling the first and second cranks, respectively, to the drive shaft, and wherein the first indexing bearing transfers rotation of the first crank in the forward direction to rotation of the drive shaft in the forward direction when the first piston transfers energy from the energy source to rotation of the first crank in the forward direction, and the first indexing bearing accommodating forward rotation of the drive shaft when the first crank is idle, and wherein the second indexing bearing transfers rotation of the second crank in the forward direction to rotation of the drive shaft in the forward direction when the second piston transfers energy from the energy source to rotation of the second crank in the forward direction, and the second indexing bearing accommodating forward rotation of the drive shaft when the second crank is idle.

5. The engine of claim 4 further comprising first and second backstopping bearings coupling the first and second cranks, respectively, to the housing, and wherein the first backstopping bearing inhibits the first crank from rotating in the reverse direction and accommodates rotation of the first crank in the forward direction relative to the housing, and wherein the second backstopping bearing inhibits the second crank from rotating in the reverse direction and accommodates rotation of the second crank in the forward direction relative to the housing.

6. The engine of claim 5 wherein the first indexing bearing is axially positioned along a first portion of the drive shaft and the first backstopping bearing is axially positioned along a second portion of the drive shaft, and wherein the first and second portions of the drive shaft axially overlap.

7. The engine of claim 1, wherein the first crank has a first inner axial endface and the second crank has a second inner axial endface spaced axially apart from and directed toward the first inner axial endface, and wherein the first impact protrusion protrudes axially from the first inner axial endface toward the second crank, and the second impact protrusion protrudes axially from the second inner axial endface toward the first crank.

8. The engine of claim 7, further comprising a first impact ring fixed to the first inner axial endface of the first crank for rotating with the first crank about the axis, and a second impact ring fixed to the second inner axial endface of the second crank for rotating with the second crank about the axis, the first and second impact protrusions fixed to the first and second impact rings, respectively.

9. A drive assembly for a rotary drive, comprising:
a housing;
a drive shaft within the housing and rotatable about an axis in a forward direction;
a chamber within the housing and extending about the drive shaft;
an input port fluidly coupled to the chamber for supplying an energy source to the chamber at a first energy level;
an output port fluidly coupled to the chamber for evacuating the energy source from the chamber at a second energy level lower than the first energy level;
first and second cranks coupled to the drive shaft, each of the first and second cranks independently rotatable in the forward direction about the axis for rotating the drive shaft, and each of the first and second cranks inhibited from rotating in a reverse direction opposite the forward direction;
first and second pistons disposed circumferentially about the axis and within the chamber, and fixed to the first and second cranks, respectively, the first and second pistons for transferring energy from the energy source to rotation of the first and second cranks in the forward direction, respectively; and
first and second impact protrusions fixed relative to the first and second cranks, respectively, the first impact protrusion impacting the second impact protrusion during rotation of the first piston toward the second piston in the forward direction for transferring momentum from the first crank to the second crank to urge rotation of the second crank in the forward direction.

* * * * *